3,078,073
                                                                                                      Patented Feb. 19, 1963

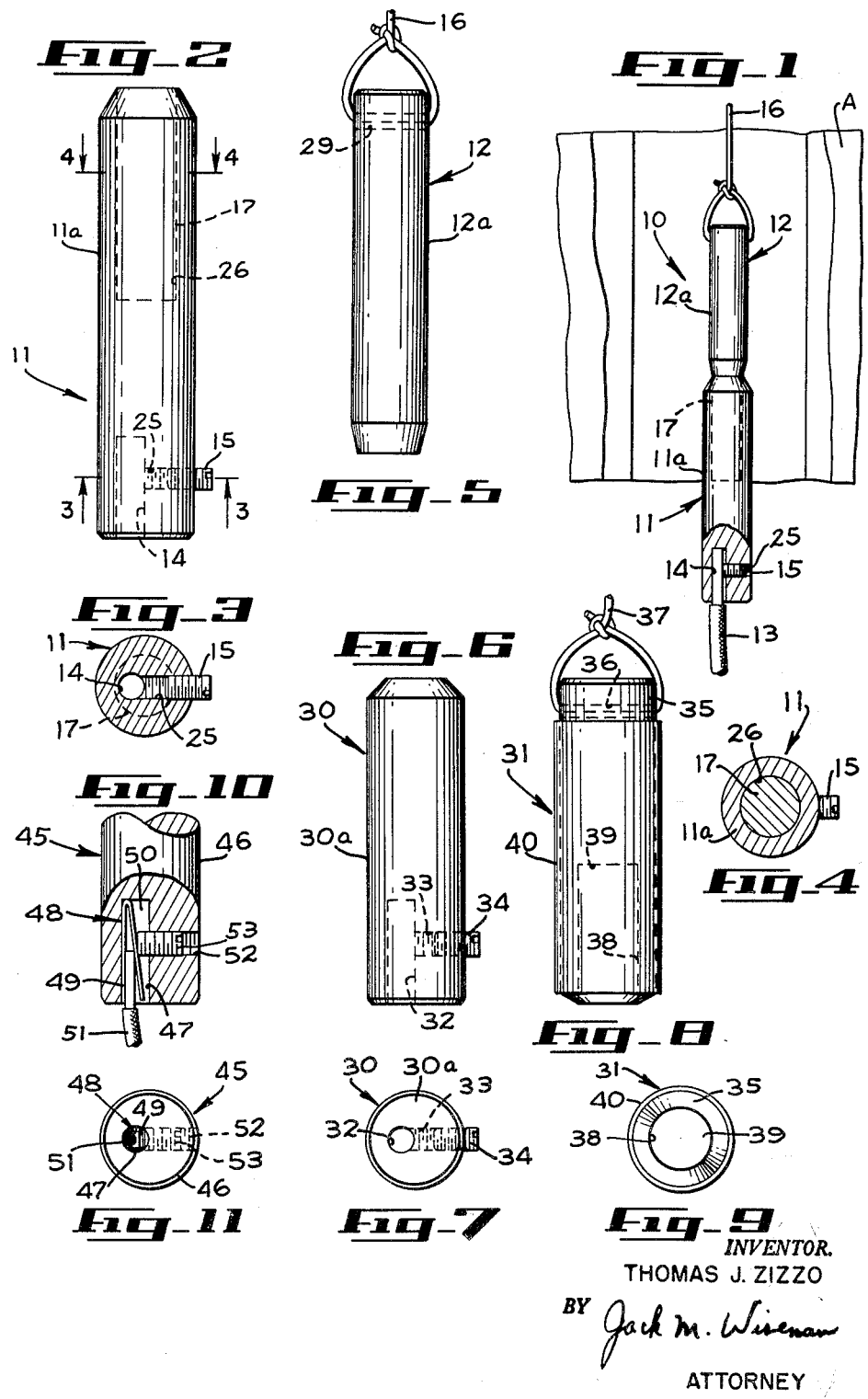

3,078,073
ELECTRICAL WIRE FINDER
Thomas J. Zizzo, Santa Clara, Calif., assignor to GZR Co., Inc., San Jose, Calif., a corporation of California
Filed June 12, 1961, Ser. No. 116,374
8 Claims. (Cl. 254—134.3)

The present invention relates in general to a device for facilitating the establishment of electrical connections between separately located conductors, and more particularly to a device for locating an electrical conductor that is inaccessible.

Electrical contractors for houses, buildings and other structures expend considerable time and effort in an attempt to establish a connection from a cable in the structure to the conductors of a new electrical installation. This is particularly so when the cable and the new installation are located in different areas of the building. Often, it is difficult to find the exact location of the electrical conductors of the installation when attempting to do so from the area in which the cable is located. The reason for this difficulty is that beams and other structural units may be in the line of sight from the cable to the wires of the new installation and in the path of travel of the cable to the wires of the new installation. This problem is readily recognizable when a cable is located in the attic of a home and an electrical outlet is being installed in a room below. Generally, beams and other structural units interfere with the lowering of the cable to the wires of the new installation or the raising of the wires of the new installation to the cable.

Accordingly, an object of the present invention is to provide a device for facilitating the establishment of electrical connections between conductors located in different areas.

Another object of the present invention is to provide a device for locating an electrical conductor that is inaccessible.

Another object is to provide a device for locating an electrical conductor that is economical to manufacture without sacrificing durability.

Another object of the present invention is to provide a device for bringing together separately located electrical conductors.

Other objects will appear upon perusal of the detailed description taken in conjunction with the accompanying drawings, in which:

FIG. 1 is an elevational view of the electrical wire finder of the present invention shown in conjunction with wallboard and stud of a building.

FIG. 2 is an enlarged elevational view of the conductor holder of the wire finder shown in FIG. 1.

FIG. 3 is a horizontal sectional view taken along line 3, 3 of FIG. 2.

FIG. 4 is a horizontal sectional view taken along line 4, 4 of FIG. 2.

FIG. 5 is an enlarged elevational view of the senser of the wire finder shown in FIG. 1.

FIG. 6 is an elevational view of a modification of the conductor holder shown in FIG. 2.

FIG. 7 is a bottom view of the conductor holder shown in FIG. 6.

FIG. 8 is an elevational view of a modification of the senser illustrated in FIG. 5.

FIG. 9 is a bottom view of the senser shown in FIG. 8.

FIG. 10 is a fragmentary view partially in section and partially in elevation of a further modification of the conductor holder shown in FIG. 2.

FIG. 11 is a bottom view of the conductor holder shown in FIG. 10.

Illustrated in FIG. 1 is the wire finder 10 of the present invention which comprises a conductor holder 11 and a senser 12 that is made of suitable magnetizable material such as iron. When an electrical installation is to be made, such as installing an electrical outlet in a wall, an opening is formed in the wall to accommodate the outlet and the connecting conductors. A conductor 13 for the outlet installation is inserted in an aperture 14 formed in the holder 11 and a retaining screw 15 is rotated so as to hold the conductor 13 in the aperture 14 of the conductor holder 11. Thereupon, the holder 11 with the conductor 13 is inserted into the opening of the wall behind the structural unit, such as wallboard A.

An operator stands above the electrical outlet in an area, such as attic, where an electrical cable, not shown, is located. The operator by means of a flexible line 16, which is attached to the senser 12, lowers the senser 12 in the vicinity of the conductor holder 11. Included in the conductor holder 11 is a permanent magnet 17, which attracts the senser 12 thereto and holds the senser 12 in contact with the conductor holder 11. At this time, the operator can raise the conductor holder 11 with the installation conductor 13 to the cable, not shown, to make the electrical connection. In the alternative, the operator could have attached the cable to the flexible line 16 and lowered the senser 12 with the cable in the vicinity of the conductor 11. When the senser 12 contacts the conductor holder 11, an operator can establish the electrical connection at the location of the outlet to be installed.

As shown in FIGS. 2–4, the conductor holder 11 comprises a solid body member 11a with a cylindrical configuration, which is made of suitable material such as aluminum. Formed in the lower extremity of the body member 11a is the aperture 14, which is of sufficient size to accommodate the end of an electrical wire, such as the conductor 13 (FIG. 1). A suitable radial opening 25 is formed in the lower extremity of the body member 11a to intersect the aperture 14 at right angles. The retaining screw 15 is received by the radial opening 25. After the installation, conductor 13 is inserted into the aperture 14, the retaining screw 15 is rotated so that the conductor 13 is securely held by the conductor holder 11.

At the upper portion of the body member 11a is formed an axial bore 26 for receiving in tight fitting relation the permanent magnet 17. In the preferred embodiment, the magnet 17 is a carbonite magnet and is fixed within the bore 26. The upper end of the body member 11a, which engages the senser 12, is bevelled.

The senser 12 (FIG. 5) includes a solid body member 12a with a cylindrical configuration, which is made of suitable magnetizable material, such as iron. At the upper portion of the body member 12a is formed therethrough a suitable radial aperture 29 for receiving the lower end of the flexible line 16. The flexible line 16 is securely attached to the body member 12a. The lower end of the body member 12a, which is the end that engages the conductor holder 11, is bevelled.

In the use of the wire finder 10, the installation conductor 13 has the connecting end thereof inserted into the aperture 14 of the conductor holder 11. The retaining screw is rotated so that the conductor holder 11 holds securely the installation wire 13. An operator then places the conductor holder 11 in an opening behind a wallboard or partition with the permanent magnet 17 and bevelled end thereof facing in the general direction of the connecting cable or wire, not shown.

Thereupon, an operator located in the area where the connecting cable or wire is located lowers the senser 12 by means of the flexible line 16 in the direction of the conductor holder 11. When the senser 12 is in the vicinity of the conductor holder 11, the permanent magnet 17 will attract the senser 12 and draw the senser to contact the conductor holder 11. The magnet 17 is of sufficient strength to retain the senser 12 in engagement with the conductor holder 11. The operator can raise the flexible line 16 to carry the connecting conductor 13 to the connecting cable for establishing an electrical connection. In the alternative, the operator can secure the connecting cable to the flexible line 16 and lower the senser 12 until the senser 12 contacts the conductor holder 11. The operator at the location of the conductor holder 11 can then remove the cable from the flexible line 16 and establish an electrical connection between the cable and the conductor 13.

A modification 30 of the conductor holder 11 is shown in FIGS. 6 and 7, and a modification 31 of the senser 12 is illustrated in FIGS. 8 and 9. The conductor holder 30 and the senser 31 cooperate to form a wire finder, which is employed in a manner similar to that described in connection with the wire finder 10.

The conductor holder 30 comprises a body member 30a with a cylindrical configuration and is made of a suitable magnetizable material, such as iron. Formed in the lower extremity of the body member 30a is an aperture 32, which is of sufficient size to accommodate the end of an electrical conductor. A suitable radial opening 33 is formed in the lower extremity of the body member 30a to intersect the aperture 32 at right angles. A retaining screw 34 is received by the radial opening opening 33. Through this arrangement an installation conductor can be securely held by the conductor holder 30.

The senser 31 comprises a solid body member 35 having a cylindrical configuration and made of suitable material, such as aluminum. At the upper portion of the body member 35 is formed therethrough a radial aperture 36 for receiving the lower end of a flexible line 37, which is securely attached to the body member 35. At the lower portion of the body member 35 is formed an axial bore 38 for receiving in tight fitting relation a permanent magnet 39. In the preferred embodiment, the magnet 39 is a carbonite magnet and is fixed within the bore 38. Encompassing the body member 35 in tight fitting relation is a tubular-shaped, dielectric shield 40.

For improved magnetic attraction between a conductor holder and a senser, it is within the purview of the present invention to have a wire finder comprise the conductor holder 11 and the senser 31. In this manner, the conductor holder and the senser would individually include permanent magnets that are located adjacent the engaging surfaces thereof. Further, the body members of the conductor holder and the senser could be made of aluminum. Such a conductor holder and senser cooperate to form a wire finder, which is employed in a manner similar to that described in connection with the wire finder 10.

A further modification 45 of the conductor holder 11 is shown in FIGS. 10 and 11, which illustrate an improved electrical conductor holding arrangement. The conductor holder 45 comprises a body member 46. Formed at the lower portion of the body member 46 is an aperture 47. Inserted into the aperture 47 in fixed relation is a leaf spring 48 having depending walls 49 and 50. An installation conductor, such as conductor 51, is inserted between the walls 49 and 50. A radial opening 52 is formed in the body member 46 to intersect at right angles the aperture 47. The opening 52 receives a retaining screw 53, which engages the wall 50 of the leaf spring 48. After the installation wire 51 is inserted between the walls 49 and 50 of the leaf spring 48, the retaining screw 53 is rotated so that the conductor 51 is securely held by the conductor holder 45.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A conductor holder for a wire finder comprising a body member, said body member being formed with an opening for receiving an electrical conductor, a screw supported by said body member for releasably retaining the electrical conductor in said opening, and a magnet disposed within said body member.

2. A conductor holder for a wire finder comprising a body member, said body member including means for releasably gripping and holding an electrical conductor thereto, and a magnet disposed within said body member.

3. A conductor holder for a wire finder comprising a body member resilient means supported by body member for releasably holding an electrical conductor, and a magnet disposed within said body member.

4. A conductor holder for a wire finder comprising a body member, a magnet disposed at one end of said body member, said body member being formed at another end thereof with an opening for receiving an electrical conductor, and retaining means received by said body member and arranged to releasably grip the electrical conductor received by said opening for holding the conductor in said opening.

5. A wire finder comprising a first body member, means on said first body member for detachably gripping an electrical conductor, a magnetizable second body member, and a magnet in said first body member for attracting said second body member to said first body member.

6. A wire finder comprising a magnetizable first body member, means on said first body member for detachably gripping an electrical conductor thereto, a second body member, a flexible line attached to said second body member, and a magnet in said second body member for urging said second body member into engagement with said first body member.

7. A wire finder comprising a first body member, a screw on said first body member for detachably securing an electrical conductor to said first body member, a magnet disposed within said first body member, a second body member, a flexible line attached to said second body member, and a magnet in said second body member for attracting said second body member to said first body member.

8. A conductor holder for a wire finder comprising a body member, a magnet disposed at one end of said body member, said body member being formed at another end thereof with an opening for receiving an electrical conductor, and a spring disposed within said opening to releasably engage the electrical conductor received by said opening.

References Cited in the file of this patent

UNITED STATES PATENTS

| | | |
|---|---|---|
| 1,094,106 | White | Apr. 21, 1914 |
| 2,729,494 | Trowbridge | Jan. 3, 1956 |
| 2,732,243 | Mount | Jan. 24, 1956 |
| 2,857,970 | Hopkins | Oct. 28, 1958 |